(12) United States Patent
Kamon et al.

(10) Patent No.: US 11,192,264 B2
(45) Date of Patent: Dec. 7, 2021

(54) HIP JOINT STRUCTURE OF ROBOT

(71) Applicant: KAWASAKI JUKOGYO KABUSHIKI KAISHA, Kobe (JP)

(72) Inventors: Masayuki Kamon, Akashi (JP); Toshihiko Takagi, Kobe (JP); Miu Suzuki, Kobe (JP); Junichi Karasuyama, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 16/767,007

(22) PCT Filed: Nov. 21, 2018

(86) PCT No.: PCT/JP2018/043072
§ 371 (c)(1),
(2) Date: May 26, 2020

(87) PCT Pub. No.: WO2019/103066
PCT Pub. Date: May 31, 2019

(65) Prior Publication Data
US 2021/0001498 A1    Jan. 7, 2021

(30) Foreign Application Priority Data
Nov. 24, 2017    (JP) .............................. JP2017-226263

(51) Int. Cl.
*B62D 57/032* (2006.01)
*B25J 17/00* (2006.01)

(52) U.S. Cl.
CPC ............ *B25J 17/00* (2013.01); *B62D 57/032* (2013.01)

(58) Field of Classification Search
CPC .................................................... B62D 57/032
See application file for complete search history.

(56) References Cited

U.S. PATENT DOCUMENTS

| | | | | |
|---|---|---|---|---|
| 5,455,497 A * | 10/1995 | Hirose | ................. | B62D 57/032 180/8.1 |
| 6,583,595 B1 * | 6/2003 | Hattori | ................. | B62D 57/032 318/567 |
| 7,942,221 B1 * | 5/2011 | Tilden | ................. | B62D 57/032 180/8.6 |
| 9,555,846 B1 * | 1/2017 | Saunders | ................... | B25J 9/14 |
| 2009/0001919 A1 * | 1/2009 | Tsusaka | ................. | B25J 9/1045 318/568.12 |
| 2011/0185837 A1 * | 8/2011 | Alfayad | ............... | B62D 57/032 74/490.05 |
| 2018/0186000 A1 * | 7/2018 | Xiong | ...................... | B25J 9/102 |
| 2018/0256989 A1 * | 9/2018 | Adekunle | ............... | A63F 13/35 |

FOREIGN PATENT DOCUMENTS

JP    H05-305578 A    11/1993

* cited by examiner

*Primary Examiner* — Howard J Sanders
*Assistant Examiner* — Gregory T Prather
(74) *Attorney, Agent, or Firm* — Oliff PLC

(57) ABSTRACT

A hip joint structure of a robot includes a pair of thigh base-end members and a pillar-shaped pelvis member disposed so as to be sandwiched between the pair of thigh base-end members. A flange part is formed in each of left and right end parts in a front surface of the pelvis member, and each of left and right end parts in a rear surface of the pelvis member by a recess extending in the vertical direction. The flange part is fastened to the thigh base-end member by a fastening member.

5 Claims, 5 Drawing Sheets

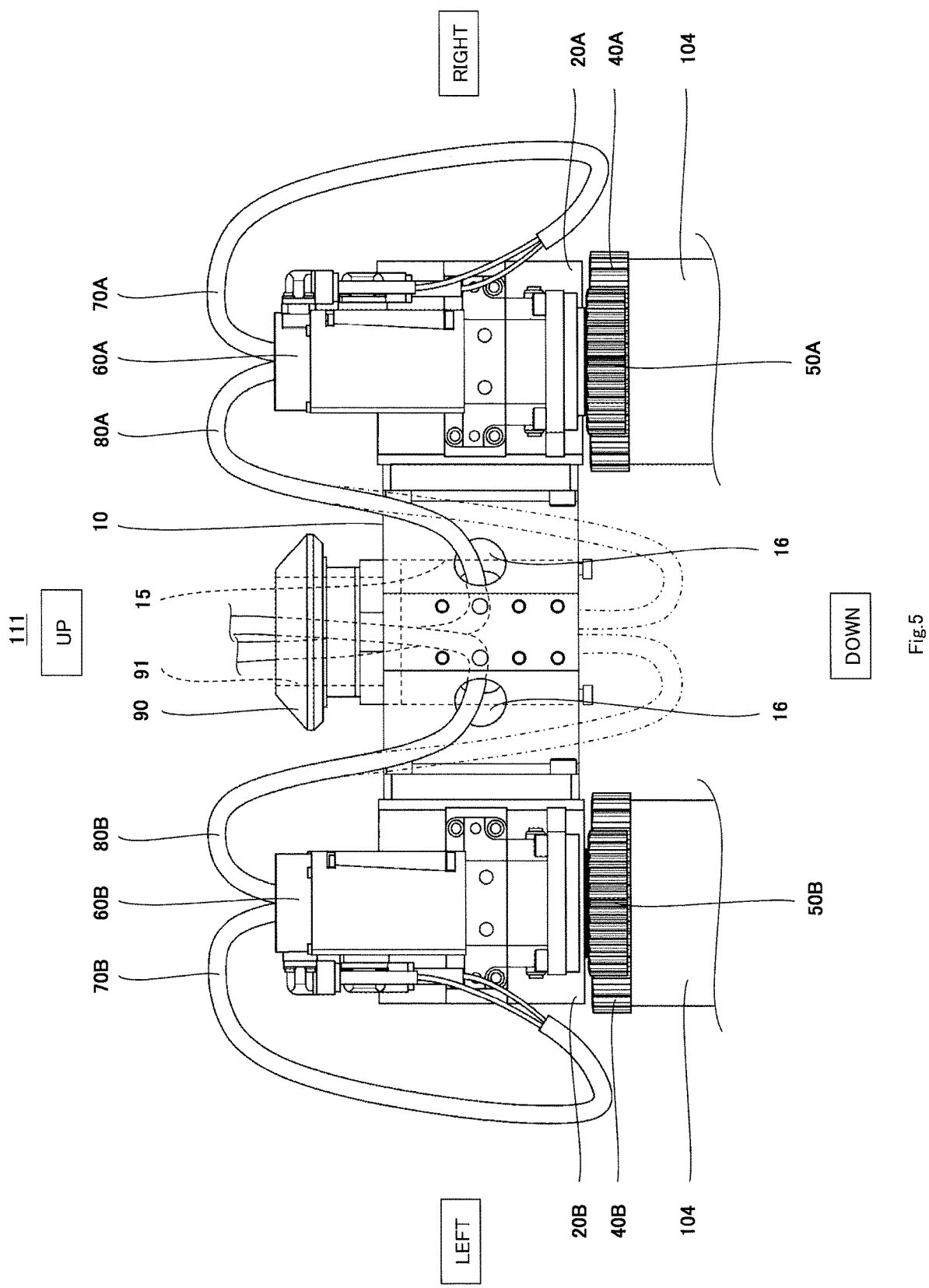

HIP JOINT STRUCTURE OF ROBOT

TECHNICAL FIELD

The present disclosure relates to a hip joint structure of a robot.

BACKGROUND ART

Legged walking robots in which a body part is coupled to a hip plate of a foot link via an impact absorbing mechanism are known (e.g., see Patent Document 1). In the legged walking robot disclosed in Patent Document 1, left and right legs are coupled to the body part through the hip plate.

In detail, Harmonic Drive System (product name) which constitutes a rotary joint for the legs are disposed inside the hip plate. A fixed side of a circular spline on the Harmonic Drive System is fastened to the hip plate with bolts, and a drive side of the circular spline is fastened to an output member which constitutes the legs with bolts. The bolts are disposed so as to be inserted into through-holes extending in the vertical direction of the hip plate and the output member.

REFERENCE DOCUMENT OF CONVENTIONAL ART

Patent Document

[Patent Document 1] JP1993-305578A

DESCRIPTION OF THE DISCLOSURE

Problem to be Solved by the Disclosure

In the legged walking robot disclosed in Patent Document 1, the body part is disposed above the hip plate, and the legs are disposed below the output member. Thus, since a gap into which a tool, such as a screwdriver used, enters is small when tightening or removing the bolt, there is a problem that it is difficult to attach and/or remove the leg when manufacturing and performing a maintenance of a robot.

The present disclosure is made in view of solving the above conventional problem, and one purpose thereof is to provide a hip joint structure of a robot in which attachment and/or removal of a leg is easily performed, when manufacturing and performing a maintenance of the robot.

Summary of the Disclosure

In order to solve the problem described above, a hip joint structure of a robot is provided, which includes a pair of thigh base-end members, and a pillar-shaped pelvis member disposed so as to be sandwiched between the pair of thigh base-end members. A flange part is formed in each of left and right end parts in a front surface of the pelvis member, and each of left and right end parts in a rear surface of the pelvis member by a recess extending in the vertical direction. The flange part is fastened to the thigh base-end member by a fastening member.

Since the flange parts are formed in the pelvis member by the recess, a downsizing of the robot can be achieved. Further, since the flange parts are fastened to the thigh base-end members by the fastening members, a work of attachment and/or removal of the thigh base-end members, and legs having the thigh base-end members to/from the flange parts, can be easily performed.

Effect of the Disclosure

According to the hip joint structure of a robot of the present disclosure, while downsizing the robot, the work of the attachment and/or the removal of the leg unit can be easily performed.

BRIEF DESCRIPTION OF DRAWINGS

FIG. 5 is a rear view of the hip joint structure of the robot illustrated in FIG. 3.

MODE FOR CARRYING OUT THE DISCLOSURE

Figure 1:
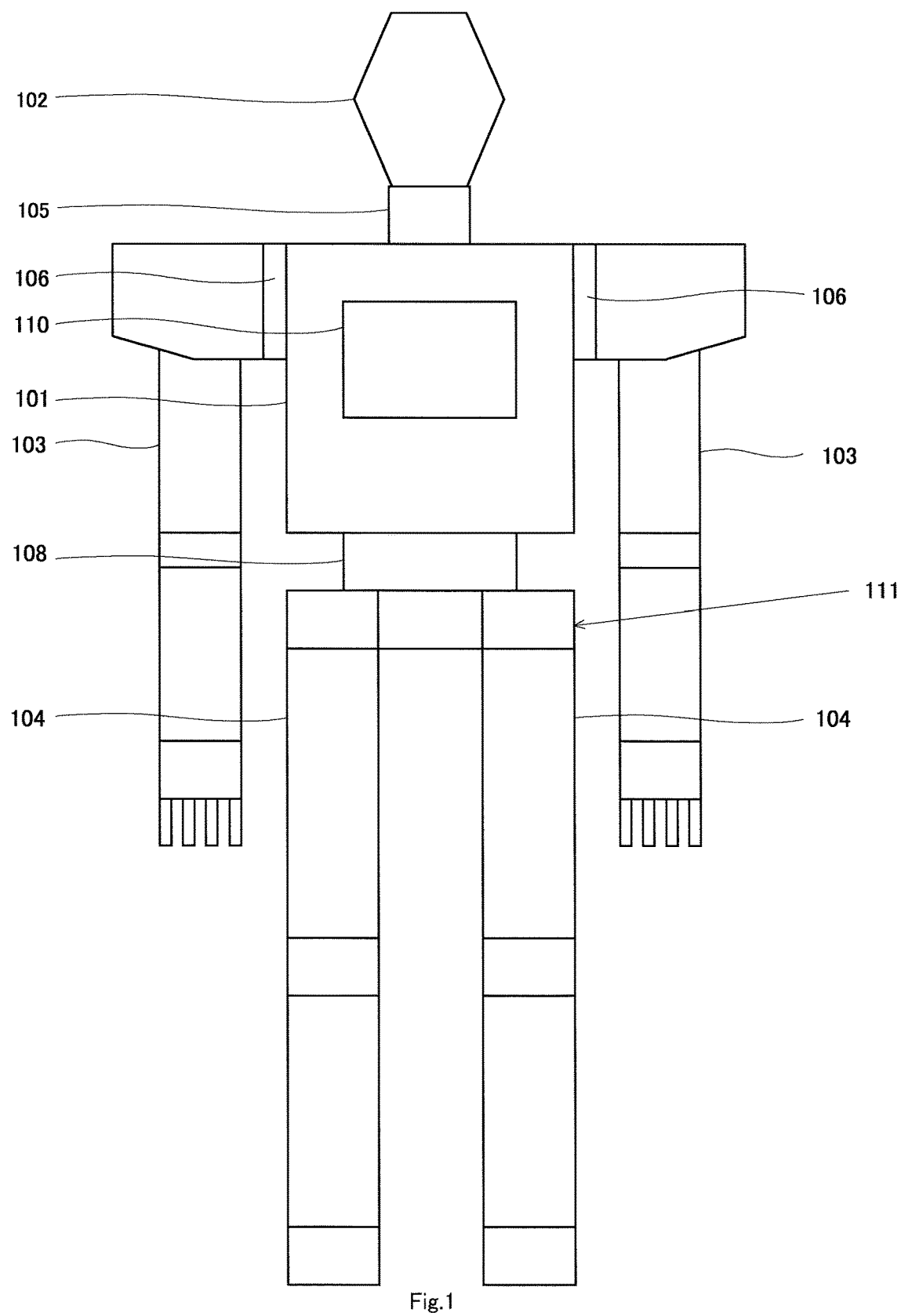
FIG. 1 is a schematic view illustrating an outline configuration of a robot provided with a hip joint structure according to Embodiment 1.

Hereinafter, one embodiment of the present disclosure is described with reference to the drawings. Note that, throughout the drawings, the same reference characters are given to the same or corresponding parts to omit redundant description. Moreover, throughout the drawings, components illustrating the present disclosure are selectively illustrated, and illustration of other members may be omitted. Further, the present disclosure is not limited to the following embodiment.

Embodiment 1

A hip joint structure of a robot according to Embodiment 1 includes a pair of thigh base-end members, and a pillar-shaped pelvis member disposed so as to be sandwiched by the pair of thigh base-end members. A flange part is formed in each of left and right end parts in a front surface of the pelvis member, and each of left and right end parts in a rear surface of the pelvis member by a recess extending in the vertical direction. The flange part is fastened with the thigh base-end member by a fastening member.

Alternatively, in the hip joint structure of the robot according to Embodiment 1, a through-hole extending in the vertical direction may be formed in the thigh base-end member, a bearing member having a hollow part may be disposed in the through-hole, and a connector which connects a first cable disposed in the leg with a second cable disposed in a body or trunk may be accommodated in the hollow part of the bearing member.

Alternatively, in the hip joint structure of the robot according to Embodiment 1, a first through-hole extending in the vertical direction may be formed in the pelvis member, and a second through-hole may be formed in a recess formed in the front and/or the rear surface of the pelvis member so that the second through-hole communicates with the first through-hole. The second cable may be pulled out of the pelvis member via the second through-hole from the first through-hole.

Below, one example of the hip joint structure of the robot according to Embodiment 1 is described with reference to FIGS. 1 to 5.

Configuration of Robot

First, a configuration of the robot provided with the hip joint structure according to Embodiment 1 is described with reference to FIG. 1.

FIG. 1 is a schematic view illustrating an outline configuration of a robot provided with the hip joint structure according to Embodiment 1.

As illustrated in FIG. 1, a robot 100 includes a body 101, a head 102, a pair of arms 103, a pair of legs 104, and a control device 110 disposed inside the body 101.

The head 102 is connected with the body 101 through a neck joint 105. A drive mechanism (not illustrated) for pivoting (rotating) the head 102 relatively to the body 101 is disposed in the neck joint 105.

Similarly, each arm 103 is connected with the body 101 through a shoulder joint 106. A drive mechanism (not illustrated) for pivoting (rotating) the arm 103 relatively to the body 101 is disposed in the shoulder joint 106.

The drive mechanisms disposed at the neck joint 105 and the shoulder joints 106 are each comprised of a drive member, such as an actuator (e.g., an electric motor (servo motor)) and a rack and a pinion or a belt and a pulley.

Each leg 104 is connected with a waist 108 which constitutes a part of the body 101 through a hip joint structure 111 according to Embodiment 1. A configuration of the hip joint structure 111 will be described later.

Note that, in Embodiment 1, although the control device 110 is disposed inside the body 101, it is not limited to this configuration. The control device 110 may be disposed inside other constituent members, such as the head 102, or may be disposed outside the robot 100.

Here, a configuration of the control device 110 is described with reference to FIG. 2.

Figure 2:
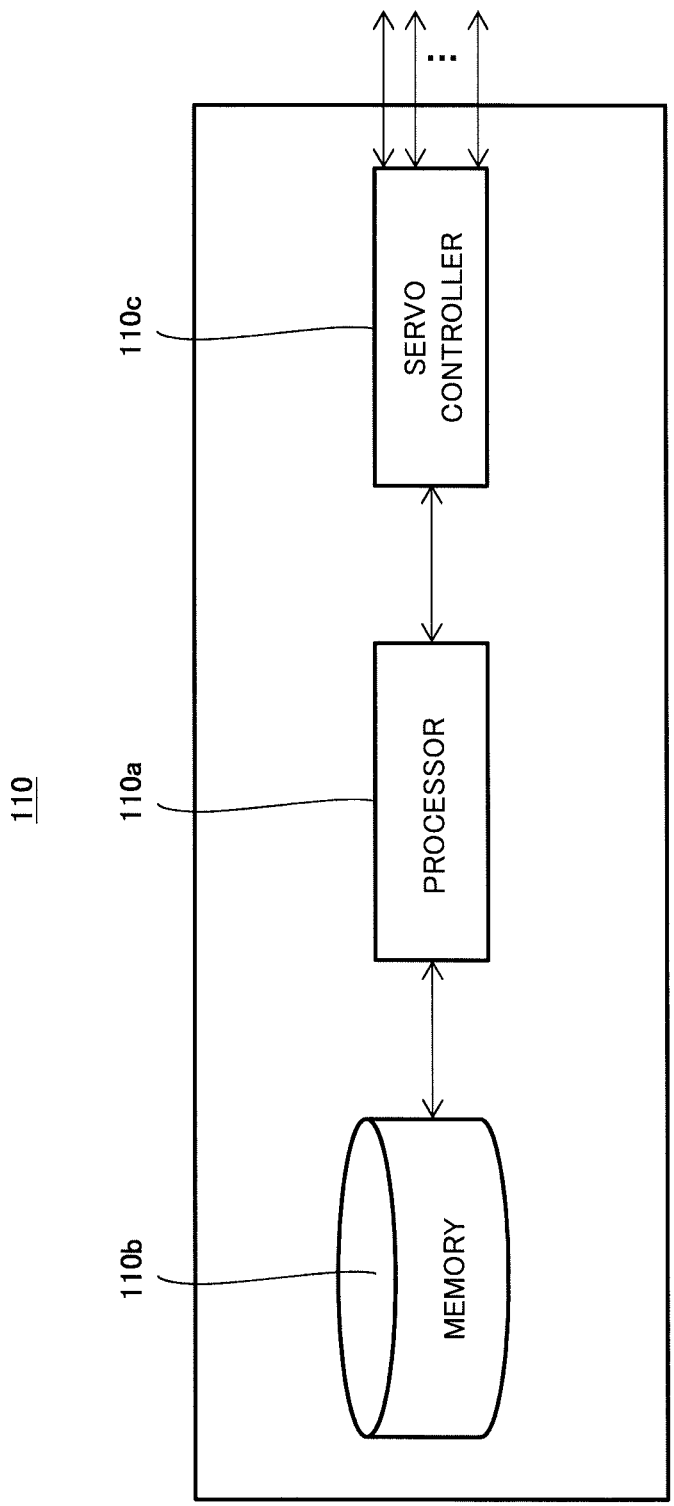
FIG. 2 is a functional block diagram schematically illustrating a configuration of a control device in the robot illustrated in FIG. 1.

FIG. 2 is a functional block diagram schematically illustrating the configuration of the control device in the robot illustrated in FIG. 1.

As illustrated in FIG. 2, the control device 110 includes a processor 110a, such as a CPU, a memory 110b, such as a ROM and a RAM, and a servo controller 110c. For example, the control device 110 may be a robot controller provided with a computer, such as a microcontroller.

Note that the control device 110 may be comprised of a sole control device 110 which carries out a centralized control, or may be comprised of a plurality of control devices 110 which collaboratively carry out a distributed control. Moreover, in Embodiment 1, although the memory 110b is disposed inside the control device 110, it is not limited to this configuration, and the memory 110b may be provided separately from the control device 110.

The memory 110b stores information, such as a basic program and various fixed data. The processor 110a controls various operations of the robot by reading and executing software, such as the basic program stored in the memory 110b. That is, the processor 110a generates a control command for the robot, and outputs it to the servo controller 110c. The servo controller 110c controls drive of a servo motor provided to each joint of the robot 100 based on the control command generated by the processor 110a.

Configuration of Hip Joint Structure of Robot

Next, a configuration of the hip joint structure 111 of the robot according to Embodiment 1 is described with reference to FIGS. 3 to 5.

Figure 3:
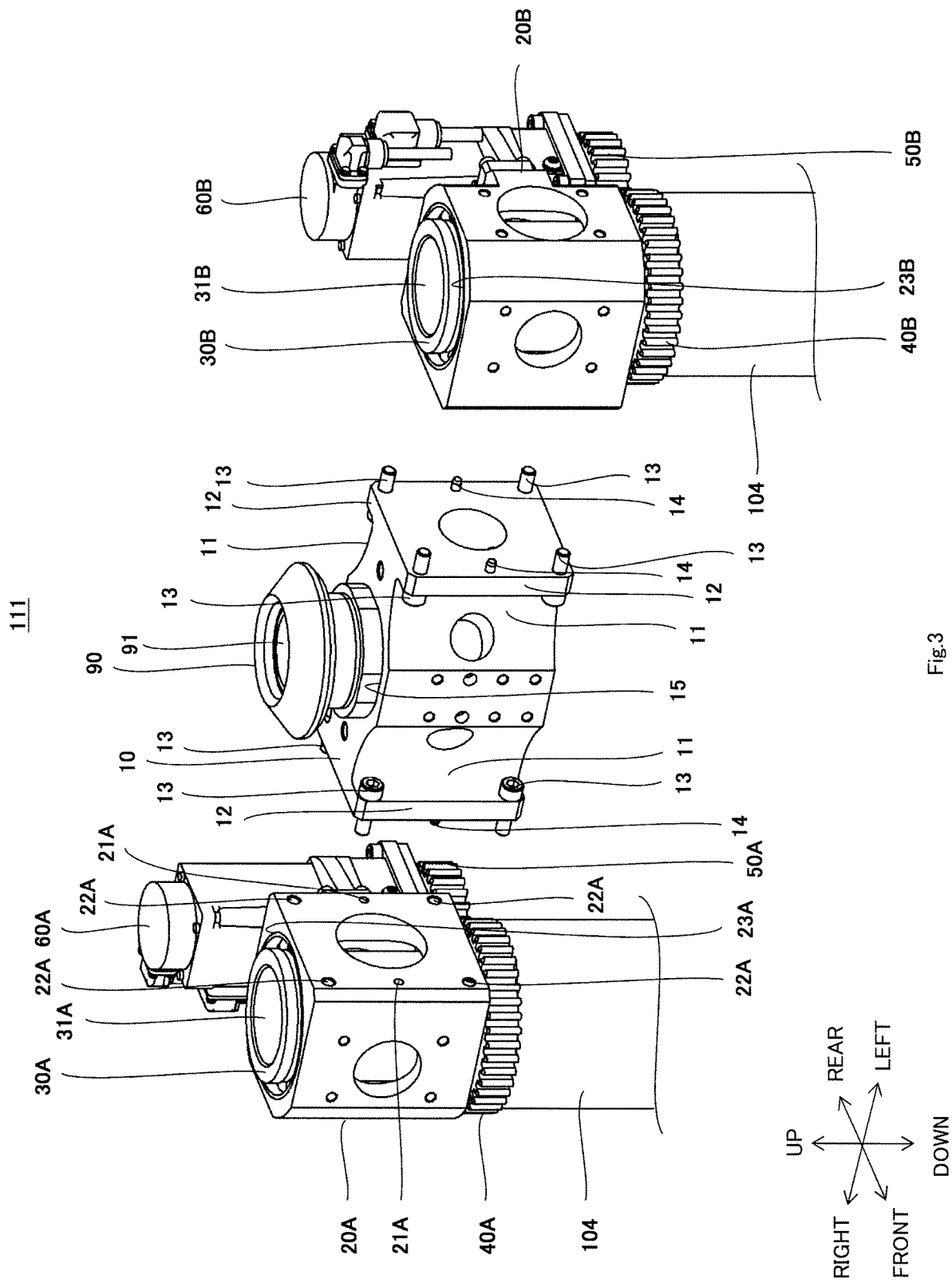
FIG. 3 is an exploded view illustrating an outline configuration of the hip joint structure of the robot according to Embodiment 1.

FIG. 3 is an exploded view illustrating an outline configuration of the hip joint structure of the robot according to Embodiment 1. FIG. 4 is a side view of the hip joint structure of the robot illustrated in FIG. 3. FIG. 5 is a rear view of the hip joint structure of the robot illustrated in FIG. 3. Note that, in FIGS. 3 to 5, up and down, left and right, and front and rear of the hip joint structure of the robot is expressed as up and down, left and right, and front and rear of the figures.

Figure 4:
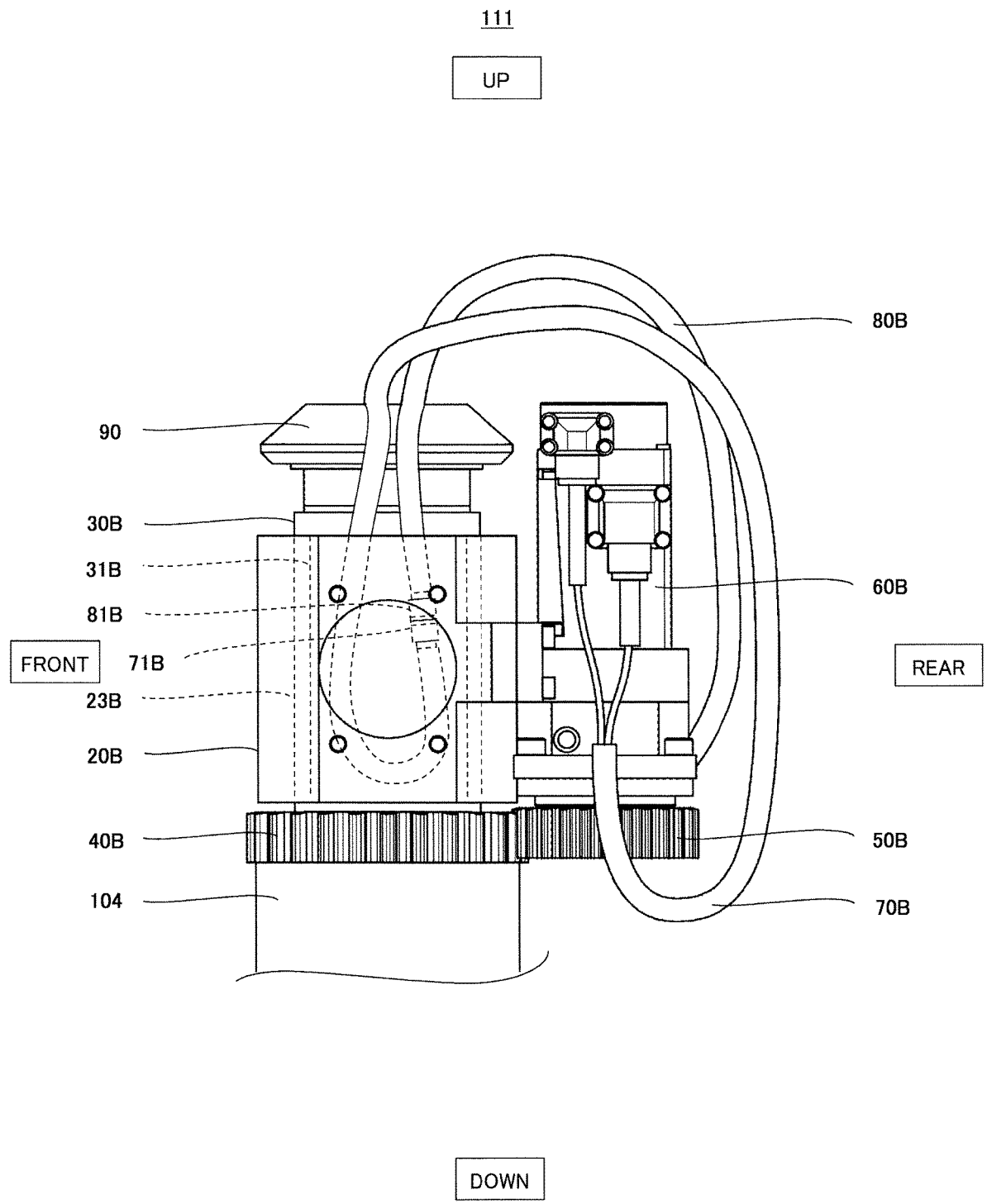
FIG. 4 is a side view of the hip joint structure of the robot illustrated in FIG. 3.

As illustrated in FIGS. 3 to 5, the hip joint structure 111 of the robot according to Embodiment 1 includes a pair of thigh base-end members 20A and 20B, and a pelvis member 10. The pelvis member 10 is disposed so as to be sandwiched by the pair of thigh base-end members 20A and 20B. The pelvis member 10 and the thigh base-end members 20A and 20B are each formed in a pillar-shape (here, a rectangular pillar shape).

A flange part 12 is formed in each of left and right end parts in a front surface and a rear surface of the pelvis member 10 by a recess 11 extending in the vertical direction. Moreover, a first through-hole 15 which penetrates an upper surface and a lower surface is formed in the pelvis member 10, and a lower end part of a waist connecting member 90 is fitted into the first through-hole 15. A through-hole 91 extending in the vertical direction is formed in the waist connecting member 90 so as to communicate with the first through-hole 15.

Moreover, a second through-hole 16 is formed in the recess 11 on the rear surface side of the pelvis member 10 so as to communicate with the first through-hole 15. Note that the second through-hole 16 may be formed in the recess 11 on the front surface side of the pelvis member 10.

Through-holes extending in the left-and-right direction is formed in the flange part 12, and fastening members (here, bolts) 13 are inserted in the through-holes. Moreover, positioning pins 14 are disposed in left and right side surfaces of the pelvis member 10.

Positioning recesses 21A are disposed in a left side surface of the thigh base-end member 20A. The recesses 21A can perform positioning of the pelvis member 10 and the thigh base-end member 20A by fitting with the pins 14 disposed in the right side surface of the pelvis member 10.

Moreover, recesses 22A are disposed in the left side surface of the thigh base-end member 20A for threadedly engaging with tip-end parts of the fastening members 13. Therefore, the pelvis member 10 is fastened to the thigh base-end member 20A by the fastening members 13.

Similarly, the positioning recesses (not illustrated) are disposed in a right side surface of the thigh base-end member 20B. The recesses can perform positioning of the pelvis member 10 and the thigh base-end member 20B by fitting with the pins 14 disposed in the left side surface of the pelvis member 10.

Moreover, the recesses (not illustrated) are disposed in the right side surface of the thigh base-end member 20B for threadedly engaging with tip-end parts of the fastening members 13. Therefore, the pelvis member 10 is fastened to the thigh base-end member 20B by the fastening members 13.

Note that, in Embodiment 1, although the recesses 21A and 22A are disposed in the thigh base-end members 20A and 20B, it is not limited to this configuration. For example, instead of the recesses 21A, through-holes may be disposed in the thigh base-end members 20A and 20B, and the pins 14 may fit into the through-holes. Alternatively, for example, instead of the recesses 22A, through-holes may be disposed in the thigh base-end members 20A and 20B, and the fastening members 13 threadedly engage with the through-holes.

Further, a through-hole 23A extending in the vertical direction is disposed in the thigh base-end member 20A. A bearing member 30A having a hollow part 31A is disposed in the through-hole 23A. For example, a bearing can be used as the bearing member 30A.

The leg 104 is fixed to a lower end part of the bearing member 30A through a first gear 40A. A second gear 50A meshes with the first gear 40A, and an output shaft of an electric motor 60A is fixed to the second gear 50A. The electric motor 60A is fixed to the rear surface of the thigh base-end member 20A. Therefore, by the electric motor 60A actuating, the leg 104 can relatively pivot (rotate) to the thigh base-end member 20A about an axis extending in the vertical direction (yaw axis).

Similarly, a through-hole 23B extending in the vertical direction is disposed in the thigh base-end member 20B. A bearing member 30B having a hollow part 31B is disposed in the through-hole 23B. For example, a bearing can be used as the bearing member 30B.

The leg 104 is fixed to a lower end part of the bearing member 30B through a first gear 40B. A second gear 50B meshes with the first gear 40B, and an output shaft of an electric motor 60B is fixed to the second gear 50B. The electric motor 60B is fixed to the rear surface of the thigh base-end member 20B. Therefore, by the electric motor 60B actuating, the leg 104 can relatively pivot (rotate) to the thigh base-end member 20B about an axis extending in the vertical direction (yaw axis).

As illustrated in FIG. 4, a base-end part of a first cable 70B is connected to the electric motor 60B. A connector 71B is disposed at a tip-end part of the first cable 70B, and a connector 71B is connected to a connector 81B disposed at a base-end part of a second cable 80B. The connectors 71B and 81B are accommodated in the hollow part 31B of the bearing member 30B.

Moreover, as illustrated in FIG. 5, the second cable 80B passes through a through-hole 91 of the waist connecting member 90 from a second through-hole (left side) 16 of the pelvis member 10 via a first through-hole 15. The second cable 80B is disposed so as to be pulled into the body 101 from the upper part of the pelvis member 10.

Note that, for example, the tip-end part of the second cable 80B may be connected to a battery disposed inside the robot 100, an electric motor other than the electric motors 60A and 60B, or an electric socket disposed in a house (none of them is illustrated). Alternatively, for example, the tip-end part of the second cable 80B may be connected to the control device 110.

Similarly, a base-end part of a first cable 70A is connected to the electric motor 60A. A connector is disposed at a tip-end part of the first cable 70A, and this connector is connected to a connector disposed at a base-end part of a second cable 80A (none of them is illustrated). These connectors are accommodated in the hollow part 31A of the bearing member 30A.

Moreover, as illustrated in FIG. 5, the second cable 80A passes through the through-hole 91 of the waist connecting member 90 from a second through-hole (right side) 16 of the pelvis member 10 via the first through-hole 15. The second cable 80A is disposed so as to be pulled into the body 101 from the upper part of the pelvis member 10.

Note that, for example, the tip-end part of the second cable 80A may be connected to a battery disposed inside the robot 100, an electric motor other than the electric motors 60A and 60B, or an electric socket disposed in a house (none of them is illustrated). Alternatively, for example, the tip-end part of the second cable 80A may be connected to the control device 110.

In the hip joint structure 111 of the robot according to Embodiment 1 constructed in this way, the flange parts 12 are formed in the front surface and the rear surface of the pelvis member 10 by the recesses 11. Thus, a downsizing of the robot 100 can be achieved, as compared with a case where flange parts are formed so as to protrude from the front surface and the rear surface of the pelvis member 10.

Moreover, since other members are not disposed on the recess 11 side where the flange part 12 is formed, an enough space for placing a tool, such as a screw driver can be secured. Thus, a work for fastening the thigh base-end members 20A and 20B to the flange parts 12, and a work for removing the thigh base-end members 20A and 20B from the flange parts 12 can be easily performed.

Moreover, in the hip joint structure 111 of the robot according to Embodiment 1, the flange parts 12 and the thigh base-end members 20A and 20B are fastened by inserting the fastening members 13 from the flange part 12 side. Therefore, the robot 100 can be downsized, as compared with a case where the fastening members 13 are inserted from the thigh base-end members 20A and 20 side, and the flange parts 12 and the thigh base-end members 20A and 20B are fastened.

That is, when inserting the fastening members 13 from the thigh base-end members 20A and 20 side, it is necessary to dispose the fastening members 13 so as to avoid the bearing members 30A and 30B, and therefore, the thickness of the bearing members 30A and 30B in the front-and-rear direction becomes larger. However, when inserting the fastening members 13 from the flange parts 12 side, since it is not necessary to increase the thickness of the bearing members 30A and 30B in the front-and-rear direction, the robot 100 can be downsized.

Moreover, in the hip joint structure 111 of the robot according to Embodiment 1, the connector which connects the first cable 70A to the second cable 80A is accommodated in the hollow part 31A of the bearing member 30A. Similarly, the connectors 71B and 81B which connect the first cable 70B to the second cable 80B are accommodated in the hollow part 31B of the bearing member 30B.

Therefore, the robot 100 can be downsized, as compared with the form in which an electric socket for connecting the two cables is disposed in the external surface of the pelvis member 10, and the thigh base-end members 20A and 20B, for example. Moreover, by connecting and disconnecting the connector, the electric connection and disconnection of the first cable 70A and the second cable 80A, or the first cable 70B and the second cable 80B can be easily performed. Therefore, the maintenance work can be easily performed.

Further, in the hip joint structure 111 of the robot according to Embodiment 1, the second cables 80A and 80B are disposed so as to be pulled into the body 101 from the upper part of the pelvis member 10 from the second through-hole 16 of the pelvis member 10 via the first through-hole 15. Therefore, as illustrated by two-dot chain lines in FIG. 5, the robot 100 can be downsized, as compared with a case where the second cables 80A and 80B are inserted from a lower end part of the pelvis member 10.

That is, when inserting the second cables 80A and 80B from the lower end part, it is necessary to increase a radius of curvature of the cables in order to prevent breakage of the cables. Thus, when disposing a cover member which covers the lower end part of the pelvis member 10, the cover member increases in the size and, as a result, the robot increases in the size.

On the other hand, in the hip joint structure 111 of the robot according to Embodiment 1, since the second cables 80A and 80B are inserted from the second through-holes 16 of the pelvis member 10, it is not necessary to increase the size of the cover member which covers the lower end part of the pelvis member 10. Thus, the robot 100 can be downsized.

Note that, in Embodiment 1, although the hip joint structure 111 is applied to the bipedal or two-legged walking robot, it is not limited to this configuration. The hip joint structure 111 may be applied to a quadrupedal or four-legged walking robot.

It is apparent for a person skilled in the art that many improvements or other embodiments of the present disclosure are possible from the above description. Therefore, the above description is to be interpreted only as illustration, and it is provided in order to teach a person skilled in the art the best mode to implement the present disclosure. The details of the structures and/or the functions may be changed substantially, without departing from the spirit of the present disclosure.

INDUSTRIAL APPLICABILITY

Since the hip joint structure of the robot of the present disclosure allows the attachment and/or the removal of the leg unit to be easily performed, while achieving the downsizing of the robot, it is useful in the field of industrial robots.

DESCRIPTION OF REFERENCE CHARACTERS

10 Pelvis Member
11 Recess
12 Flange Part
13 Fastening Member
14 Pin
15 First Through-Hole
16 Second Through-Hole
20A Thigh Base-End Member
20B Thigh Base-End Member
21A Recess
22A Recess
23A Through-Hole
23B Through-Hole
30A Bearing Member
30B Bearing Member
31A Hollow Part
31B Hollow Part
40A First Gear
40B First Gear
50A Second Gear
50B Second Gear
60A Electric Motor
60B Electric Motor
70A First Cable
70B First Cable
71B Connector
80A Second Cable
80B Second Cable
81B Connector
90 Waist Connecting Member
91 Through-Hole
101 Body
102 Head
103 Arm
104 Leg
105 Neck Joint
106 Shoulder Joint
108 Waist
110 Control Device
110a Processor
110b Memory
110c Servo Controller
111 Hip Joint Structure

The invention claimed is:

1. A hip joint structure of a robot, comprising:
a first thigh base-end member;
a second thigh base-end member; and
a pillar-shaped pelvis member sandwiched between the first thigh base-end member and the second thigh base-end member, wherein
flange parts are formed, one in each of left and right end parts in a front surface of the pelvis member and left and right end parts in a rear surface of the pelvis member, by respective recesses extending vertically, and
each of the flange parts is fastened to one of the first thigh base-end member or the second thigh base-end member by a respective fastening member inserted into a respective one of left-and-right direction through-holes in the flange parts.

2. The hip joint structure of claim 1, wherein
the first thigh base-end member comprises a first through-hole extending vertically,
a first bearing member having a first hollow part is in the first through-hole, and
a connector configured to connect a first cable disposed in a leg to a second cable disposed in a body is in the first hollow part of the first bearing member.

3. The hip joint structure of claim 2, wherein
the pelvis member comprises a second through-hole extending vertically, and a third through-hole communicating one of the recesses with the second through-hole, and
the second cable extends out of the pelvis member from the second through-hole via the third through-hole.

4. A hip joint structure of a robot, comprising:
a first thigh base-end member;
a second thigh base-end member; and
a pillar-shaped pelvis member sandwiched between the first thigh base-end member and the second thigh base-end member, wherein
flange parts are formed, one in each of left and right end parts in a front surface of the pelvis member and left and right end parts in a rear surface of the pelvis member, by respective recesses extending vertically,
each of the flange parts is fastened to one of the first thigh base-end member or the second thigh base-end member by a respective fastening member,
the first thigh base-end member comprises a first through-hole extending vertically,
a first bearing member having a first hollow part is in the first through-hole,
a first connector configured to connect a first cable disposed in a first leg to a second cable disposed in a body is in the first hollow part of the first bearing member,
the second thigh base-end member comprises a second through-hole extending vertically,
a second bearing member having a second hollow part is in the second through-hole, a second connector configured to connect a third cable disposed in a second leg to a fourth cable disposed in the body is in the second hollow part of the second bearing member.

5. The hip joint structure of claim 4, wherein
the pelvis member comprises
   a third through-hole extending vertically,
   a fourth through-hole communicating one of the recesses with the third through-hole, and
   a fifth through-hole communicating another of the recesses with the third through-hole;
the second cable extends out of the pelvis member from the third through-hole via the fourth through-hole; and
the fourth cable extends out of the pelvis member from the third through-hole via the fifth through-hole.

\* \* \* \* \*